United States Patent [19]

Miles et al.

[11] Patent Number: 4,553,513
[45] Date of Patent: Nov. 19, 1985

[54] THERMODYNAMIC ROTARY ENGINE

[76] Inventors: Perry E. Miles; Mary A. P. Miles, both of 45 Kimberley Rd., Penylan, Cardiff, Wales

[21] Appl. No.: 536,531

[22] Filed: Sep. 28, 1983

Related U.S. Application Data

[63] Continuation of Ser. No. 247,796, Mar. 26, 1981, abandoned.

[30] Foreign Application Priority Data

Mar. 28, 1980 [GB] United Kingdom ................. 8010588

[51] Int. Cl.⁴ .............................................. F02G 3/00
[52] U.S. Cl. .................................... 123/204; 123/234; 418/173
[58] Field of Search ............... 60/39.63; 123/204, 234, 123/236; 418/173

[56] References Cited

U.S. PATENT DOCUMENTS

| | | | |
|---|---|---|---|
| 58,086 | 9/1866 | Fletcher | 418/173 |
| 899,027 | 9/1908 | Burton | 418/173 X |
| 1,473,656 | 11/1923 | Wagenhorst | 123/234 |
| 1,969,192 | 8/1934 | Williams et al. | 123/234 X |
| 2,248,639 | 7/1941 | Miksits | 123/204 |
| 3,104,527 | 9/1963 | Gesell | 60/39.63 |
| 3,651,641 | 3/1972 | Ginter | 60/39.63 X |
| 3,989,011 | 11/1976 | Takahashi | 123/204 |

FOREIGN PATENT DOCUMENTS

| | | | |
|---|---|---|---|
| 640812 | 1/1937 | Fed. Rep. of Germany | 123/234 |
| 1815711 | 6/1970 | Fed. Rep. of Germany | 123/204 |
| 16203 | 5/1972 | Japan | 123/236 |

*Primary Examiner*—Michael Koczo
*Attorney, Agent, or Firm*—Fleit, Jacobson, Cohn & Price

[57] ABSTRACT

A thermodynamic rotary engine (2) comprising a positive displacement compressor (4), a combustion chamber (6) in which air from the compressor and fuel are burnt, and a rotatable cyclicly operating gas expander (10) for receiving combustion gas from the combustion chamber, the gas expander comprising a rotor (12) which is constructed for rotation within a cylinder (16), the cylinder being rotatable with the rotor in the same direction as the rotor, the cylinder and the rotor defining between them a variable volume expansion chamber (10) as they rotate during operation of the engine, the cylinder having a fixed inwardly projecting vane (22) which slidably engages in sealing means (24) in the rotor and so divides the variable volume expansion chamber into two portions, the sealing means being rotatable in the rotor so that the vane can remain engaged between the rotor and the cylinder in spite of differential rotational speeds between the rotor and the cylinder during each cycle of operation of the gas expander, and the gas expander having inlet port means (28, 30) and outlet port means (32).

14 Claims, 4 Drawing Figures

THERMODYNAMIC ROTARY ENGINE

This is a continuation of application Ser. No. 247,796 filed Mar. 26, 1981, now abandoned.

Accordingly, this invention provides a rotary engine which operates on a single-pass, constant pressure, thermodynamic process, which rotary engine comprises a rotary positive-displacement compressor for supplying continuous compressed air, a combustion chamber which is for receiving the compressed air from the compressor and in which a fuel is burned at substantially constant pressure, a rotary gas expander through which the products of combustion from the combustion chamber are passed for the purpose of the generation of useful mechanical power, and mechanical connector means by which the expander drives the compressor, the expander comprising a rotor which is mounted for rotation in a cylinder which is itself rotatable about an axle displaced from that of the rotor so as to create between the cylinder and the rotor a chamber, the volume of which chamber varies with rotation of the cylinder and the rotor, and an inwardly projecting vane fixed to the cylinder and slidably engaging in a pivotable sealing means in the rotor so as to divide the chamber whilst permitting engagement between the rotor and the cylinder throughout 360° of rotation, and the expander having a fixed housing part containing inlet means for entry of the products of combustion to the chamber, which inlet means comprise a fixed first port in the housing part of the engine, which port is in communication with the combustion chamber, and a second port which rotates with and is located in one end face of the cylinder, and said expander also having outlet means for the products of combustion, which outlet means comprises an outlet port which communicates with the chamber and which is located in a circumferential face of the cylinder and rotates with the cylinder for the purpose of continuous passage of the exhaust gases to atmosphere.

When compared with known practical engines, the engine of the present invention may give a better specific fuel consumption with reduced atmospheric pollution, an improved power/weight ratio, an improved power/volume ratio, and reduced production costs. The engine of the present invention may be capable of operating on a wide range of fuels without basic modification.

The sealing means may comprise two part-cylindrical seals which fit in a substantially cylindrical seating in a rotor, the vane being positioned between the two part-cylindrical seals.

The engine may have a single shaft upon which the cylinder is mounted, the rotor being eccentrically mounted relative to the shaft and the cylinder being concentrically mounted about the shaft. The rotor may be internally liquid cooled.

The rotor may have a plurality of radially sliding seals around its periphery, the radially sliding seals effecting a sealing connection between the rotor and the cylinder during each cycle of operation of the gas expander at the portion where the rotor and the cylinder are closest together. The radially sliding seals may be effective over an arc of from −30° to +30° around the point of nearest contact between the rotor and the cylinder, there being always one seal and sometimes more than one seal in contact with the cylinder.

The rotor may have a plurality of sealing elements inserted in side faces of the rotor effecting a seal between the side faces of the rotor and the sides of the cylinder.

Preferably, the vane is mechanically secured to the cylinder. Several methods of rigidly connecting the vane to the cylinder in such a manner that it will withstand the pressures exerted on it during normal use of the engine may be employed.

Preferably, the fixed first port is adjustable about its axis for governing purposes.

Preferably, the rotor and the cylinder are cooled by a liquid.

Usually, the positive displacement compressor will be a sliding vane compressor. Other types of positive displacement compressor may however be used depending upon the precise mode of operation of the engine. The positive displacement compressor is preferably driven by a main shaft of the engine. This main shaft may be any one which supports the cylinder assembly.

The compressor may have a throttle valve placed at its inlet for facilitating operation of the engine in certain control modes.

The combustion chamber is preferably internally thermally insulated. The combustion chamber may contain a temperature sensing device, for example a thermocouple, for enabling control of the combustion temperature to be effected.

The combustion chamber may include ignition means for initially igniting a fuel:air mixture in the combustion chamber, the engine being such that after the initial combustion by the ignition means, the subsequent combustion is self-sustaining. The fuel will usually be passed, for example continuously injected, directly into the combustion chamber.

Usually, in the combustion chamber, the fuel will be mixed with an excess of air supplied from the compressor. There will be continuous burning causing a continuous volume change of the air.

Typically, the combustion chamber is in the form of a tube connecting the positive displacement compressor and the gas expander.

The engine may have a plurality of the gas expanders arranged to operate in parallel mode with respect to gas flow from the combustion chamber, without gas reheat between expanders. The engine may also have a single gas expander. In the case of multiple expander units, there may be a plurality of combustion chambers.

If desired, the engine may be one in which the or each gas expander is constructed such that it expands the induced volume of air per revolution by the compressor, to a greater volume than that which it occupied at the induction pressure thereby giving a hyper-expansion.

Generally, the positive displacement compressor will operate to compress per revolution a volume $V_1$ of air by a predetermined pressure ratio. The compressed air will then be passed to the combustion chamber where continuous combustion with the fuel will take place. The combustion will take place at an essentially constant pressure for a given engine load. The combustion of the fuel raises the temperature of the air to a predetermined maximum value. Various fuels can be used in liquid or gaseous form. The hot gaseous products of combustion then pass to the gas expander.

The gas expander cyclically expands and exhausts the gases in three distinct stages per revolution as follows:

(a) The initial introduction of gas, to each cylinder of the gas expander at constant pressure, during a certain angle of rotation.

(b) A second expansion within each cylinder, after the closure of an inlet port, according to the polytropic form $PV^n = K$. This expansion within the cylinder, after the closure of the inlet port, may continue to a greater expanded volume than the initial induced volume ($V_1$) if so desired, (i.e. a hyper-expansion) depending upon the chosen dimensions of the gas expander.

(c) Final expulsion of the gas to exhaust during the successive revolution of the cylinder.

There are several modes of engine cycle control as follows:

Control by variable mass flow, with constant temperature

In this case, the mass flow of air per cycle is varied by throttling the compressor at inlet, whilst the temperature of the products of combustion, at exit from the combustion chamber is regulated to a constant predetermined value, independent of the engine load. This is achieved by regulating the fuel flow to maintain a constant air mass flow/fuel flow ratio. In this case, throttle variation produces a variation of maximum cycle pressure.

This fact follows the fundamental efficiency relationship for a diesel engine, i.e.

$$A = 1 - \frac{1}{r_v \gamma - 1} \left[ \frac{r_c \gamma - 1}{\gamma(r_c - 1)} \right]$$

where $\frac{V_1}{V_2} = r_v$ or the compression ratio $\frac{V_3}{V_2} = r_c$ or the 'cut-off' ratio for constant pressure expansion.

A is thermal efficiency and $\gamma$ is the ratio of specific heats of air.

Control by variable mass flow, constant temperature and pressure

In this case, the mass flow through the engine is varied whilst keeping the pressure and temperature in the combustion chamber constant for all loads, at the maximum design values. This may require the use of a variable displacement compressor, without an inlet throttle, and a variable cut-off ratio for the gas expander. The expansion ratio of the gas expander can be varied by the partial rotation of rings containing inlet ports, so as to attenuate or extend the port opening period. This regulation must be made together with that of the mass-flow to the compressor, with the mandatory condition of compressor induction at atmospheric pressure, and discharge at the design pressure for all mass flow rates.

In this case the theoretical thermal efficiency of the engine improves with reducing load.

This follows from the favourable decrease in the 'cut-off' ratio $r_c = V_3/V_2$

Control by constant mass-flow with temperature governing only

In this case, the compressor always compresses the same volume of air per cycle, and the engine is governed by regulating the fuel supply to the combustion chamber, thus limiting gas temperature to the expander. This method requires the compressor to discharge air at a pressure higher than necessary at part-load conditions, unless a compressor having variable discharge characteristics is utilized. It follows that at part loads, there occurs a thermodynamically irreversible expansion of the air on exit from the compressor, until the pressure stabilises at the mean working pressure of the combustion chamber at that temperature.

When the engine is controlled by variable mass flow, with constant temperature or by constant mass flow with temperature governing then it should be noted that the ratio $(V_3/V_2) = r_v$ is always constant for the compressor, and the ratio $(V_3/V_2) = r_c$ always constant for a gas expander of given dimensions.

An embodiment of the invention will now be described solely by way of example and with reference to the accompanying drawings in which.

Figure 1:
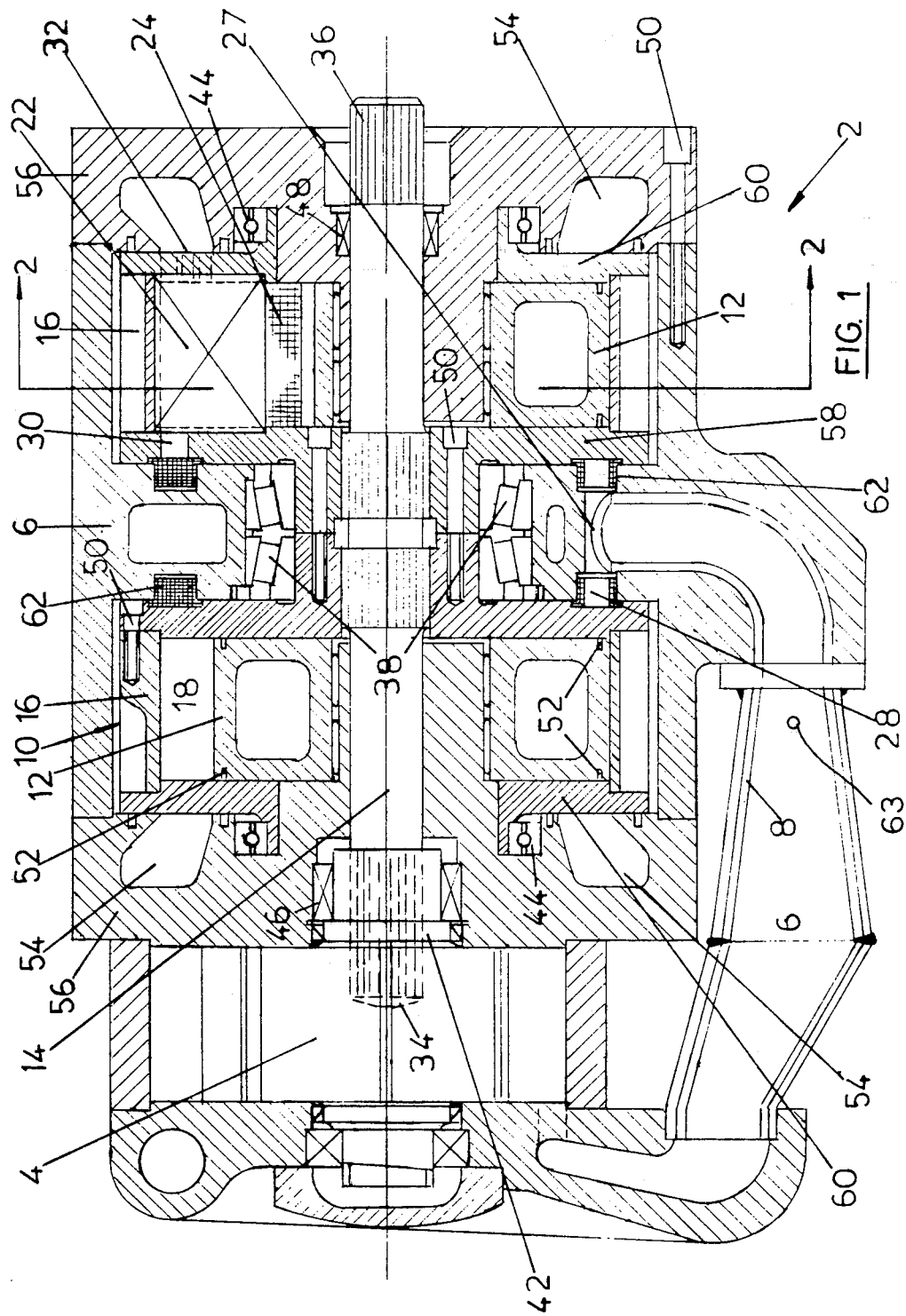
FIG. 1 is a longitudinal section through a thermodynamic rotary engine of the invention and on line 1—1 shown in FIG. 2.
Figure 2:
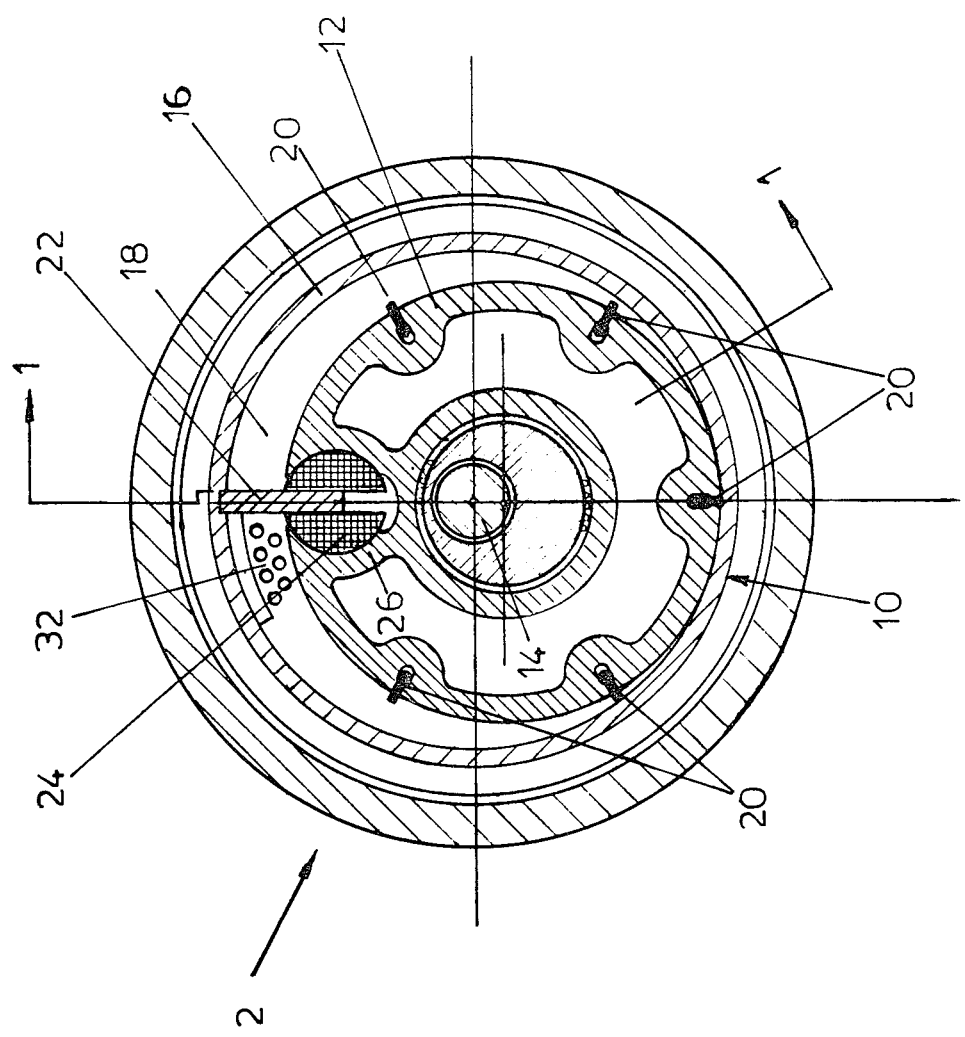
FIG. 2 is a section on the line 2—2 shown in FIG. 1.

Referring to the drawings and especially to FIGS. 1 and 2, there is shown a thermodynamic rotary engine 2 comprising a positive displacement sliding vane compressor 4 and a combustion chamber 6 in which air from the compressor and fuel are burnt. As shown, the combustion chamber 6 is substantially tubular and it has an inner refractory lining 8 for retaining heat. A temperature sensing device in the form of a thermocouple 63 is located at the exit end of the combustion chamber 6.

The engine 2 further comprises two rotary cyclicly operating gas expanders 10. As shown most clearly in FIG. 2, each gas expander 10 comprises a rotor 12 which is eccentrically mounted relative to a single main shaft 14. The rotor 12 is adapted to rotate anti-clockwise as viewed in FIG. 2 within a cylinder 16. The cylinder 16 is concentrically mounted about the shaft 14 and it is rotatable with the rotor 12 in the same anti-clockwise direction as the rotor 12. The rotor 12, the vane 22 and the cylinder 14 define between them as they rotate a variable volume expander chamber 18. The shape of the chamber 18 will obviously vary as the rotor 12 eccentrically rotates about the shaft 14.

The rotor 12 is provided with a plurality of radially sliding seals 20, at least one of which is always effective to cause a sealing connection between the periphery of the rotor 12 and the inner surface of the cylinder 16 over an arc at the position where the rotor 12 and the cylinder 16 are closest together.

The cylinder 16 is provided with a fixed inwardly projecting vane 22. The vane 22 is connected to the cylinder 16 so that it is firmly held in position on the cylinder 16. The vane 22 slidably engages in a sealing means in the form of a cylindrical seal 24 which is housed in a correspondingly shaped seating 26 in the rotor 12. As will be seen from FIG. 2, the seal 24 is constituted by two part-cylindrical portions. The seal 24 is pivotable in the seating 26 so that as the relative positions of the rotor 12 and the cylinder 16 change, the vane 22 can pivot with the seal 24. The vane 22 is effective to divide the chamber 18 into two portions, one on either side of the vane 22. As will be seen most clearly from FIG. 3, each chamber 18 has a fixed inlet port 28 in a central housing part 29 of the engine and an integral inlet port 30 in the cylinder 16. On the other side of the cylinder 16 to the port 30, there is a movable outlet port 32.

Referring again to FIG. 1, it will be seen that shaft 14 has a splined end 34 on which a compressor rotor 42 is fixed. The shaft 14 has its other end 36 also splined and this end 36 of the shaft 14 can provide a power take-off point. It will be seen that the cylinder end faces together with the shaft 14 are mounted in roller bearings 38, in a central housing 29 of the engine 2. The cylinder assemblies run on the bearings 38 and bearings 44. The ends of the shaft 14 run in bearings 48 at one end and are supported by the compressor rotor 42 and bearing 46 at the other end.

The engine 2 is made up of separate portions as illustrated, the separate portions being held together typically by the illustrated bolts 50.

The engine 2 operates as follows. Hot expanded gas under pressure from the compressor 4 and the combustion chamber 6 passes into the chambers 18 via the inlet ports 30 on the end faces of the rotating cylinders, after passing through a fixed inlet port 27 located in the illustrated central housing part of the engine 29. Gases entering each chamber 18 via the port 28 at constant pressure, do positive work on the vane 22 for a certain angle of revolution of the cylinder 16. The rotation of the same cylinder 16 then causes the port 28 to close at a predetermined angle. The gases thus entrained between the rotor 12 and the cylinder 16 continue to expand for the remainder of the revolution, doing further work on the vane 22 as they expand. The vane 22 is an integral component of the cylinder 16 and it imposes a torque on the shaft 14. The shaft 14 is itself mechanically splined to the cylinders 16. The shaft 14 serves as both output shaft and compressor drive shaft. The inlet port 32 and the vane 22 of one cylinder 16 are phased 180° apart by rotation, relative to the other cylinder 16, to give a smoother torque impulse to the engine 2 and minimize pressure fluctuations in the combustion chamber 6.

The phasing of the pressure impulses is advantageous not only to smoothen the torque impulses of the engine 2, but also because the engine 2 compresses air continuously for 360° each revolution, and admits the expanded products of combustion to the chamber 18, via the port opening, for less than 360°, typically 240°. Hence it is necessary by opporture selection of the volume of the combustion chamber 6, and two 180° phased induction periods to the two chambers 18, to control pressure fluctuations in the combustion chamber 6 to a functional value.

Gas sealing between the cylinders 16 and the rotors 12 over an arc at the line of their nearest radial contact, is achieved by the seals 20. The seals 20 are so positioned on the rotor 12 as to ensure that there is at all times at least one seal 20 in contact with the cylinder 16. The seals 20 may be held in contact initially by a light spring pressure, partly by gas pressure, and partly by centrifugal force, and they are restrained in their radial movements by their geometric form as shown. The side faces of the rotors 12 are sealed by a grid of sealing strips 52. The dynamic geometry of the rotor/cylinder configuration is accommodated by the seal 24 which forms a trunnion bearing.

After completing 360° of rotation, the expanded gases are expelled from each chamber 18 via the outlet port 32. The outlet port 32 is so positioned that gases flow to an annular exhaust collector 54 located in end-casings 56. The gases are then discharged to atmosphere. Exhausting takes place for almost 360° in the chamber portion 'ahead of' the vane 22 whilst the expansion phase is in progress in the chamber portion 'behind' the vane 22. This is possible on account of the fact that the inlet and exhaust ports are placed on opposite sides of each cylinder 16, located in end walls 58 and 60.

Expansion and exhaust phases are thus coincident, separated physically by the seals 20 and the vane 22, which vane 22 is inserted in a gas-tight manner into the cylinder 16 and the end walls 58 and 60. Each cylinder 16 thus performs one exhaust and one expansion phase per revolution, simultaneously. It is worthy of particular note that gas leakage at entry to each cylinder 16 is controlled by low friction gas sealing rings 62. These rings 62 are pressure compensated to reduce forces to acceptable values and they bear on the cylinder wall. The rings 62 each contains the 'fixed' port opening 28 which, when coincident with the 'rotating' port opening 30 on the cylinder wall, permits gas to enter the cylinder 16 during a certain angle of rotation of the cylinder 16. It is the rings 62 which, if made so as to be adjustable in a rotary sense about their axes, and operated together with a variable displacement compressor, permit the above described mode of control of the engine by variable mass flow with constant temperature and pressure. Alternatively, if the rings 62 are retained fixed, the fixed and rotating ports 28 and 30 respectively always have a constant angular opening duration relative to each other, and thus the above described engine control modes of variable mass flow with constant temperature, or constant mass flow with temperature governing only may be applied.

Figure 3:
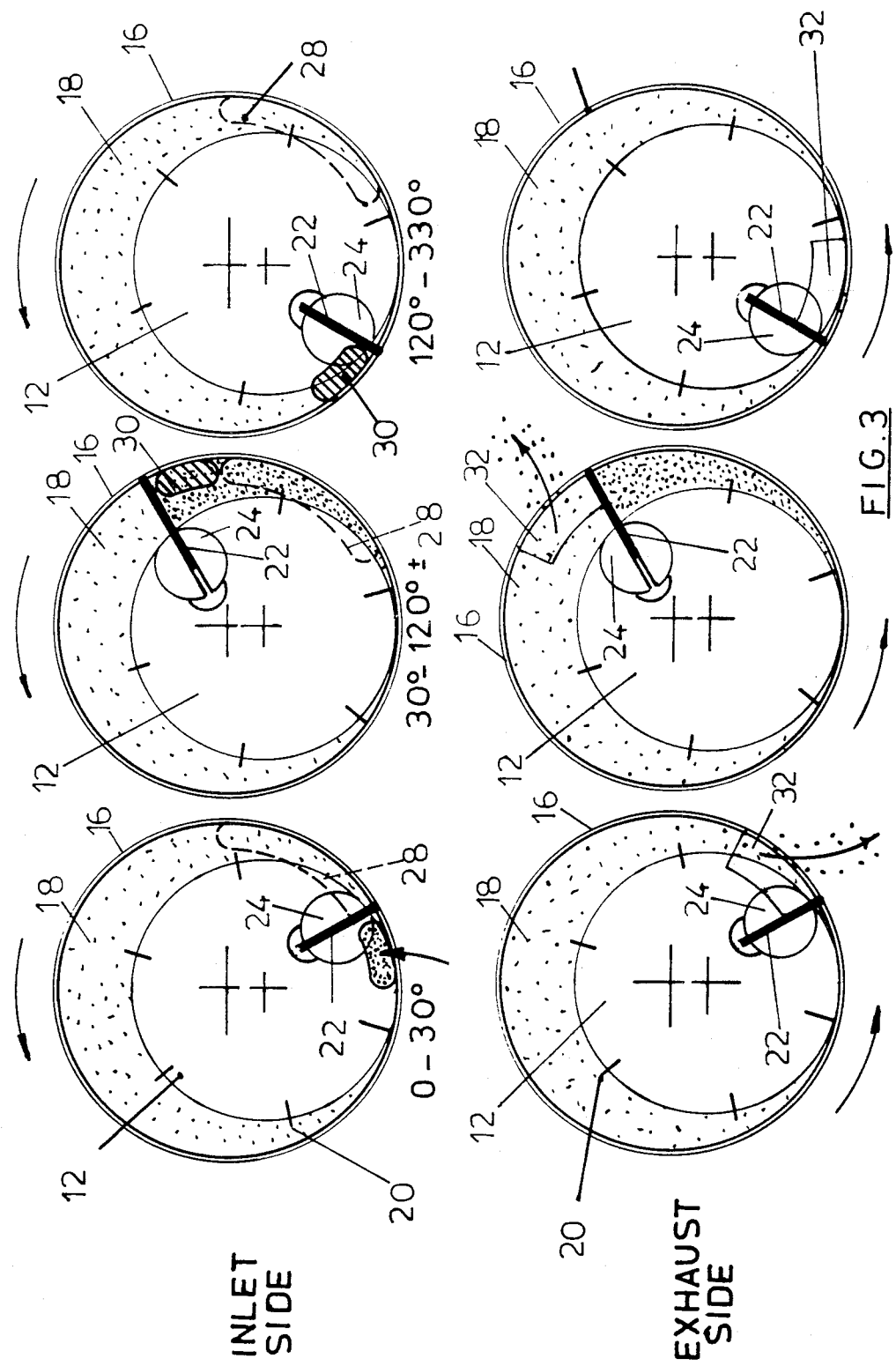
FIG. 3 shows operating stages of the engine of FIG. 1.

In FIG. 3, there are illustrated three angular positions during one revolution of the gas expander 10. Because the inlet and exhaust events occur simultaneously, the upper and lower diagrams for each angular portion respectively represent inlet and exhaust port positions at either side of the cylinder 16.

| | Inlet side | Exhaust side |
|---|---|---|
| 0°–30° | Inlet port 30 starts to open at 30° ± allowing gas at high pressure to indicate a constant pressure expansion as it flows into the cylinder "behind" the vane 22. | Previous expansion phases are complete and the exhaust port 32 opens to atmosphere "ahead" of the vane 22. Discharge of gas to the exhaust chamber 54 commences. |
| 30°–120° | Induction continues with constant pressure expansion applying torque to cylinder until inlet cut-off point at 120°±. Polytropic expansion then starts during which the inlet port 30 is sealed against the gas sealing rings 62 for remainder of revolution | Expulsion to exhaust of previously expanded gas cycle continues "ahead" of the vane 22. |
| 120°–339° | Polytropic expansion is almost complete and will finish in 30° and spent gas will then be ready to discharge to exhaust "ahead" of the vane 22 during the next revolution. | Previous exhaust phase now completed; the vane 22 will move to 'inlet open 'position during next 60° ± of rotation, and commence the next cycle |

The advantages of the engine 2 may be the following:

(i) Lower atmospheric pollution due to the combustion of fuel at high air/fuel ratios, with correspondingly more complete combustion.

(ii) The possibility to use unleaded gasolines and other fuels such as alcohol, diesel oil, natural gas, kerosene and others.

(iii) A comparatively low theoretical fuel consumption with beneficial effects covering the whole load range.

(iv) The fact that it is a low temperature, low pressure engine compared with existing positive displacement engines. This indicates a higher efficiency due to reduced gas leakage, lower frictional and heat losses, and lower losses due to dissociation and variation of specific heats of the combustion elements.

(v) The engine 2 is a rotary engine capable of high cycle speeds, all cyclic forces due to rotation being sinusoidal. The engine 2 is also readily balanced mechanically.

(vi) The engine 2 is a relatively simple engine mechanically, of inherently compact form, greatly simplified by the absence of carburettor electrical distributor, mechanical valves, camshafts and heavy reciprocating masses.

(vii) The engine 2 has a low exhaust pressure and extended exhaust phase in comparison with existing positive displacement engines, hence exhaust noise level should be low in comparison.

Figure 4:
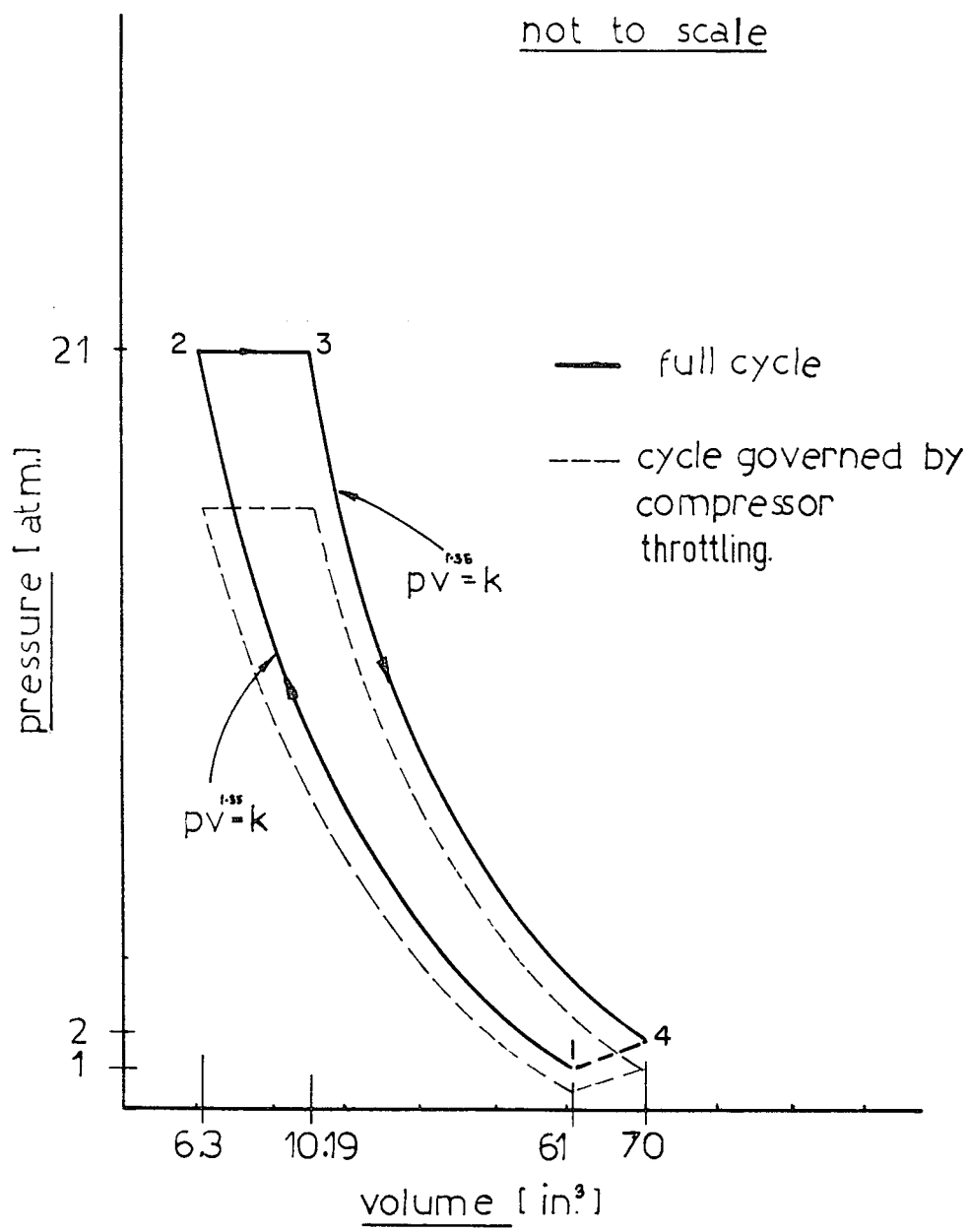
FIG. 4 is a cycle illustrating how the engine of FIG. 1 operates in a thermodynamic sense.

Referring now to FIG. 4, a typical thermodynamic cycle is illustrated concerning an engine 2 having maximum induction volume per revolution of 61 in$^3$, and a discharge pressure of 315 lbf/in$^2$ maximum from the compressor 4. The gas expander 10 has a total expansion volume of 70 in$^3$ (i.e. approx. 15% hyper-expansion). The engine 2 corresponds dimensionally to the engine 2 illustrated in FIGS. 1 and 2. It will be seen from FIG. 4 that the cycle is effected in the following stages.

1-2

61 in$^3$ of air at 60° F., pressure 14.7 lbf/in$^2$ is compressed according to law $PV^n$=const. (where n is an index between 1 and 1.4), suppose n=1.35. Discharge pressure is 315 lbf/in$^2$ after compression.

2-3

Heat is added (by the burning of a fuel in the air) at constant pressure, raising the temperature of the gas to 1400° F., which results in a constant pressure expansion to state '3', as gas is admitted to the gas expander 10, and positive work is produced.

3-4

A further polytropic expansion is then permitted to proceed, (without further admission of gas to the gas expander 10) again according to the law $PV^{1.35}$=K. This expansion continues to the full expansion volume of 70 in$^3$, producing further positive work as it does so.

4-1

The gases are then rejected to atmosphere and the gas expander 10 is ready to receive a further admission of gas at constant pressure. To determine work done per cycle, cycle efficiency and fuel consumption for the cycle.

For Volume ($V_2$) after compression if polytropic index n=1.35

$$[V_2]^{1.35} = \frac{P_1}{P_2}[V_1]^{1.35}$$

$$[V_2]^{1.35} = [61]^{1.35}_{315} [14.7]$$

$$V_2 = \underline{6.30 \text{ in}^3} \quad \underline{\quad\quad} V_2$$

For mass of air induced (m)

$$m = \frac{P_1}{R}\frac{V_1}{T_1}$$

where R is the universal gas constant $$m = \frac{[14.7][144][61]}{[12][144][53.3][520]}$$

$$M = \underline{2.696 \times 10^{-3}} \text{ lb} \quad \underline{\quad\quad} m$$

For Temperature after compression ($T_2$)

$$P_2 V_2 = mR T_2$$

$$T_2 = \frac{[315][144][6.30][10^3]}{[12][144][53.3][2.696]}$$

$$T_2 = \underline{1150° R} \quad \underline{\quad\quad} T_2$$

A quantity of heat ($Q_s$) is now added to raise the gas temperature to 1860° R (1400° F.), causing an expansion at constant pressure.

For the volume ($V_3$) of gas after expansion at constant pressure $$V_3 = \frac{[V_2]}{T_2}[T_3]$$

$$V_2 = \frac{[6.3][1860]}{1150}$$

$$V_3 = \underline{10.19 \text{ in}^3} \quad \underline{\quad\quad} V_3$$

This volume $V_3$ is now expanded according to the law $PV^{1.35}$=K to a final volume of 70 in$^3$.

For pressure after this expansion ($P_4$)

$$P_4 = P_3 \left[\frac{V_3}{V_4}\right]^{1.35}$$

$$P_4 = 315 \left[\frac{10.19}{70}\right]^{1.35}$$

$$P_4 = \underline{23.36 \text{ lbf/in}^2} \quad \underline{\quad\quad} P_4$$

For temperature ($T_4$) at pressure $P_4$.

$$P_4 V_4 = mR T_4$$

$$T_4 = \frac{[23.36][70][10^3]}{[12][53.3][2.696]}$$

-continued
$$T_4 = \underline{948.29° R} \quad \underline{\quad\quad} \quad T_4$$

For heat supplied ($Q_s$) during cycle.

$Q_s = m\, C_p\, [T_3 - T_2]$ Where $C_p$ is specific heat of air at constant pressure.

$Q_s = [2.696]\,[10^{-3}]\,[0.238]\,[1860 - 1150]$ $Q_s = \underline{0.455\ \text{btu}} \quad \underline{\quad\quad} \quad Q_s$ For heat rejected with exhaust ($Q_R$)

$Q_R = m\, C_v\, [T_4 - T_1]$ Where $C_v$ is the specific heat of air at constant volume $Q_R = [2.696]\,[10^{-3}]\,[0.1715]\,[948.29 - 520]$ $Q_R = \underline{0.198\ \text{btu}} \quad \underline{\quad\quad} \quad Q_R$ Cycle efficiency (E) is thus $$\frac{0.455 - 0.198}{0.455} = 0.5648$$

Hence the cycle has a thermal efficiency (theoretical) of 56.5%

To calculate power developed:

Nett work done per cycle = (expansion work − compressor work)

For compressor work done per cycle $W_C$ $$W_c = \frac{n}{n-1}\,[P_1 V_1 \sim P_2 V_2]$$

$$W_c = \frac{1.35}{(12)(0.35)}\,[[14.7]\,[61] \sim [315]\,[6.3]]$$

$W_c = \underline{349.65}$ ft. lb. $\quad\underline{\quad\quad}\quad W_c$

For expansion work done per cycle $W_e$ and $W_{ex}$ $$W_e = \frac{n}{n-1}\,[P_4 V_4 \sim P_3 V_3]$$

$$= \frac{(1.35)}{(12)(0.35)}\,[(22.36)\,[70] \sim [315]\,[10.19]]$$

$= \underline{528.64}$ ft. lb $\quad\underline{\quad\quad}\quad W_e$ $W_{ex} = [P_4 - P_1]\,V_4$ $$= [22.36 - 14.7]\frac{[70]}{12}$$

$= \underline{44.68}$ ft. lb $\quad\underline{\quad\quad}\quad W_{ex}$

Nett work done during cycle = $W_e + W_{ex} - W_c$ $W.D. = 528.64 + 44.68 - 349.65$ $= \underline{223.67}$ ft. lb $\quad\underline{\quad\quad}\quad W$ nett Horsepower developed for a machine cycling at 5000 revs/min is therefore $$\frac{[5000]\,[233.67]}{[33000]} = \underline{33.89}\ \text{hp}$$

For specific fuel consumption (theoretical) ($C_f$)

$$C_f = \frac{[0.455]\,[5000]\,[60]}{[19000]\,[33.89]}$$

$C_f = \underline{0.212\ \text{lb/hp/hr}} \quad\underline{\quad\quad}\quad C_f$

It could be expected therefore, that if the machine were 80% mechanically efficient, specific fuel consumption would be 0.25 lb/hp/hr. approximately.

It is to be appreciated that the embodiments of the invention described above have been given by way of example only and that modifications may be effected.

What is claimed is:

1. A rotary engine which operates on a single-pass, constant pressure, thermodynamic process, which rotary engine comprises a rotary positive-displacement compressor for supplying continuous compressed air, a combustion chamber which is for receiving the compressed air from the compressor and in which a fuel is burned at substantially constant pressure, a rotary gas expander through which the products of combustion from the combustion chamber are passed for the purpose of the generation of useful mechanical power, and mechanical connector means by which the expander drives the compressor, the expander comprising a rotor which is mounted for rotation in a cylinder which is itself rotatable about an axis displaced from that of the rotor so as to create between the cylinder and the rotor a chamber, the volume of which chamber varies with rotation of the cylinder and the rotor, and an inwardly projecting vane fixed to the cylinder and slidably engaging in a pivotable sealing means in the rotor so as to divide the chamber whilst permitting engagement between the rotor and the cylinder throughout 360° of rotation, and the expander having a fixed housing part containing inlet means for entry of the products of combustion to the chamber, which inlet means comprise a fixed first port in the housing part of the engine, which port is in communication with the combustion chamber, and a second port which rotates with and is located in one end face of the cylinder, and said expander also having outlet means for the products of combustion, which outlet means comprises an outlet port which communicates with the chamber and which is located in a circumferential face of the cylinder and rotates with the cylinder for the purpose of continuous passage of the exhaust gases to atmosphere.

2. An engine according to claim 1 in which the sealing means comprises two part-cylindrical seals which fit in a substantially cylindrical seating in the rotor, the vane being positioned between the two part-cylindrical seals.

3. An engine according to claim 1 having a single shaft upon which the cylinder is mounted, the rotor being eccentrically mounted relative to the shaft and the cylinder being concentrically mounted about the shaft.

4. An engine according to claim 1, 2 or 3 in which the rotor has a plurality of radially sliding seals around its periphery, the radially sliding seals effecting a sealing connection between the rotor and the cylinder during each cycle of operation of the gas expander over an arc in the region where the rotor and the cylinder are closest together.

5. An engine according to claim 1, 2 or 3 in which the rotor has a plurality of sealing elements inserted in side faces of the rotor effecting a seal between the side faces of the rotor and the sides of the cylinder.

6. An engine according to claim 1 in which the vane is mechanically secured to the cylinder.

7. An engine according to claim 1 in which the rotor and the cylinder are provided with a coolant liquid.

8. An engine according to claim 1 in which the positive displacement compressor is a sliding vane compressor.

9. An engine according to claim 1 in which the combustion chamber is internally thermally insulated.

10. An engine according to claim 1 in which the combustion chamber includes ignition means for initially igniting a fuel:air mixture in the combustion chamber, the engine being such that after the initial combustion by the ignition means the subsequent combustion is self-sustaining.

11. An engine according to claim 1 in which the combustion chamber contains a temperature sensing device.

12. An engine according to claim 1 in which the combustion chamber is in the form of a tube connecting the positive displacement compressor and the gas expander.

13. An engine according to claim 1 having a plurality of the gas expanders and arranged to operate in parallel mode with respect to gas flow from the combustion chamber, without gas reheat between expanders.

14. An engine according to claim 1 having a single gas expander.

* * * * *